United States Patent [19]
LaFiandra

[11] Patent Number: 6,011,639
[45] Date of Patent: *Jan. 4, 2000

[54] ONE PIECE DEFORMABLE MIRROR ACTUATOR ASSEMBLY

[75] Inventor: Carlo LaFiandra, New Canaan, Conn.

[73] Assignee: Raytheon Company, Lexington, Mass.

[ * ] Notice: This patent is subject to a terminal disclaimer.

[21] Appl. No.: 08/965,440

[22] Filed: Nov. 6, 1997

[51] Int. Cl.⁷ ................................................ G02B 26/08
[52] U.S. Cl. ............................................ 359/224; 359/223
[58] Field of Search .................................. 359/223–224, 359/290, 291, 295, 198, 199, 201; 310/328, 365, 366

[56] References Cited

U.S. PATENT DOCUMENTS 5,579,179 11/1996 Ji et al. ..................................... 359/224
5,745,278 4/1998 LaFiandra ................................ 359/224

*Primary Examiner*—James Phan
*Attorney, Agent, or Firm*—William C. Schubert; Glenn H. Lenzen, Jr.

[57] ABSTRACT

An assembly for controllably supporting a thin optical substrate (44) having a light reflective first surface (43) and an opposite back surface (45) comprises a base (12) and coupling medium for controllably movably coupling the back surface of the optical substrate and the base to one another. The coupling medium includes a multilayered medium having a plurality of piezoelectric actuators (10,10) interspersed in an array there within. The array (8) is formed from a single monolithic block (2) containing all of the piezoelectric actuators (10,10).

12 Claims, 3 Drawing Sheets

ONE PIECE DEFORMABLE MIRROR ACTUATOR ASSEMBLY

CROSS REFERENCE TO RELATED APPLICATIONS

This application relates to the following commonly assigned application Ser. Nos.: 08/293,787, for Deformable Mirror with Removable Actuators; 08/796,008, for Innovative Deformable Mirror Actuator Configuration; 08/992,022, for High Actuator Density Deformable Mirror; 08/982,920, for High Energy Burst Deformable Mirror.

BACKGROUND OF THE INVENTION

The present invention relates to a deformable mirror primarily intended for use as a beam train optic where frequency response, reliability, and cost of manufacture are critical to the design, performance and usefulness. Thus the invention has particular usefulness in deformable mirrors that are used in adaptive optical systems. This would include low and high energy beam train configurations.

A deformable mirror which is used as a downstream optic in conjunction with a substantially larger optical system which is disposed upstream thereof must possess a high degree of sensitivity with respect to its ability to make highly minute adjustments to the reflective surface of the mirror. This is because such optical downstream mirrors represent the upstream optics in miniature. Such mirrors have a diameter in the range of five to fifteen inches, but for the larger sizes use on the order of about one thousand separate piezoelectric actuators to effect such adjustments. As can be expected, the nearly one thousand piezoelectric actuators which are used, are highly miniaturized and make assembly of the approximately one thousand piezoelectric actuators with the deformable mirror painstakingly tedious.

The present invention thus has the specific advantages of the elimination of such mechanical figure control actuators, force or displacement types, which require individual fabrication, assembling and wiring into the final deformable mirror assembly one at a time. Instead, the array of actuators of the present invention are constructed in a one piece array configuration and manufactured in one piece thereby significantly reducing and/or eliminating the traditional hand labor costs required of other mechanical actuator based systems. In copending U.S. Application Ser. No. 08/796, 008, entitled, INNOVATIVE DEFORMABLE MIRROR ACTUATOR CONFIGURATION, an improved arrays are stacked side-by-side to form the total number of actuators required for a specific deformable mirror configuration. The present invention seeks to eliminate the need to stack in a side-by side relationship by forming the actuator array as a one piece unit. Thus, the prior art produces actuators on an individual piece by piece basis. Each actuator is fabricated individually and assembled and wired into the final deformable mirror assembly one by one. The disadvantage of this method is the amount of labor required to accomplish it.

Accordingly, it is an object of the present invention to provide a continually supported deformable mirror support using uniblock construction, mass produced, piezoelectric actuators as an alternative to individual piezoelectric actuators thereby eliminating manufacturing and assembly costs inherent in systems utilizing such actuators.

Still a further object of the invention is to provide a continually supported thin mirror which is lighter in weight and less expensive to manufacture than those mirrors heretofore known.

Yet a further object of the invention is to provide a more reliable electrical connection to the actuators.

Still a further object of the invention is to provide an array of actuators of the aforementioned type by forming the actuator array as a one piece unit.

Yet still a further object of the invention is to reduce the cost of fabricating deformable mirrors.

Another object of the invention lies in the fact that the method of fabrication permits significantly lower manufacturing cost, which translates into increased uses as well as lower prices to produce a deformable mirror as compared to the competition.

The invention can also be applied commercially anywhere there is a need for low cost, easily assembled actuator arrays.

SUMMARY OF THE INVENTION

An assembly for controllably supporting a thin optical substrate having a light reflective first surface and an opposite back surface comprises a base and coupling medium for controllably movably coupling the back surface of the optical substrate and the base to one another. The coupling medium includes a multilayered medium having a plurality of piezoelectric actuators interspersed in an array therewithin. The array is formed from a single monolithic block containing all of the piezoelectric actuators.

Ideally, said piezoelectric actuators include opposite vertically extending sides defined by a plurality of stacked electrodes which extend to one of said vertically extending sides depending upon the designated polarity thereof.

Preferably, the assembly includes said plurality of piezoelectric actuators each having a top flat surface which is disposed coplanar with the ends of other piezoelectric actuators and are defined in array and said array being integrally connected by a common base.

In the preferred embodiment, each of said plurality of actuators is formed from a one piece block which is subsequently cut to create spaces between each actuator and each actuator has a configuration of multilayers which are comprised of oppositely charged electrodes which are printed onto stacked layers of ceramic in a vertically interdigitated manner.

The electrodes on alternate layers are commonly connected on one of said sides of each actuator and a conductor wire is disposed along said one sides of said actuators and runs the full length thereof making electrical contact with said alternate electrode layers. If desired, the electrodes could be made to exit on any side of said actuators.

Desirably, the electrode connection uses a flexible insulator having conductor runs silk screened on one surface, making contact with an associated side of said actuator via a conductive epoxy.

An assembly as defined in claim 6 further characterized in that electrical leads are printed onto the sides of each actuator to accomplish the electrical connections to the electrodes.

DETAILED DESCRIPTION OF THE PREFERRED EMBODIMENT

Figure 1:
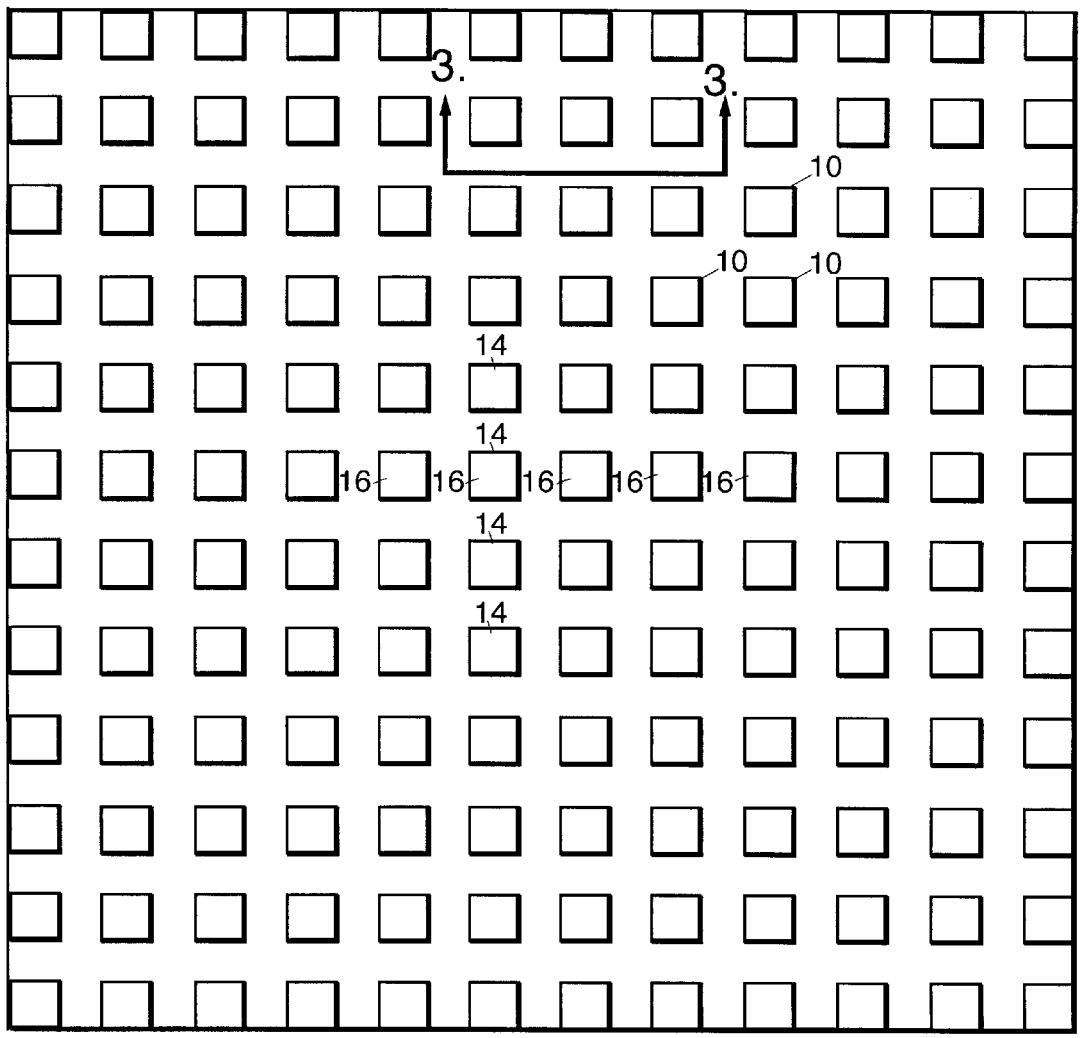
FIG. 1 is a plan view of a one piece monolithic block.

FIG. 1 is a plan view of a one piece monolithic actuator block generally designated 2. The stock material of the block is fabricated in a conventional manner with alternating layers of piezoelectric material silk screened with electrical conductors. This is normally done using either a tape cast process or a "waterfall" process.

An array 8 of piezoelectric actuators 10,10 is fabricated from the block of stock material with a conventional multi-layer construction as part of the block 2. The array 8 is made from a one piece laminated block which is subsequently saw cut to create spaces 14,14 and 16,16 between each actuator 10. Each actuator 10 has a top support surface 16 which is coplanar with the other such surfaces and extends substantially parallel with the lower surface 18 of the base 12. By way of illustration, the cuts made in the block 2 are such that each actuator is about 5 mm square and has a height taken from the base of between about 10–20 mm.

The actuators 10 are each integrally connected by a common base 12 to create a "brush" like configuration. The process employed by the invention uses a low "binder" process that permits complete binder burn-off in the solid block state. However, burn off may be done after cutting as an option. In addition, fiducials are placed on the block that ensure consistently accurate placement of the silk screened conductor electrodes on each layer. The location accuracy of these electrodes ensures that the proper ones are duly exposed during the machining process that generates the integral actuators. This process not only exposes the electrodes properly, but eliminates the sand blasting step normally used for electrode exposure in producing conventional circular actuators.

Figure 2:
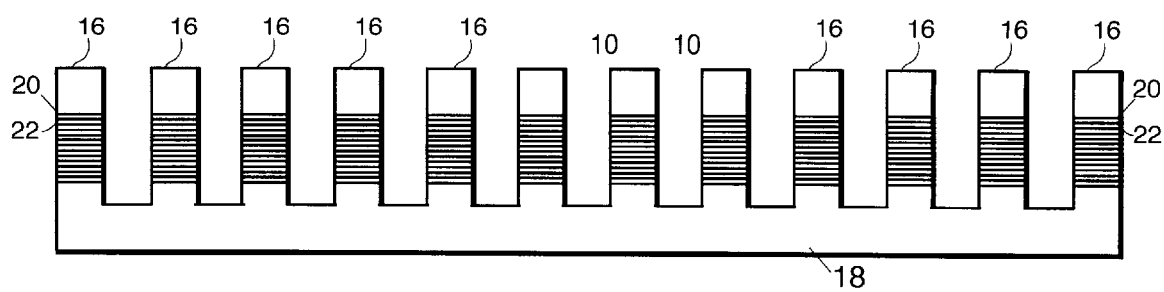
FIG. 2 is side elevation view of the block of FIG. 1.
Figure 3:
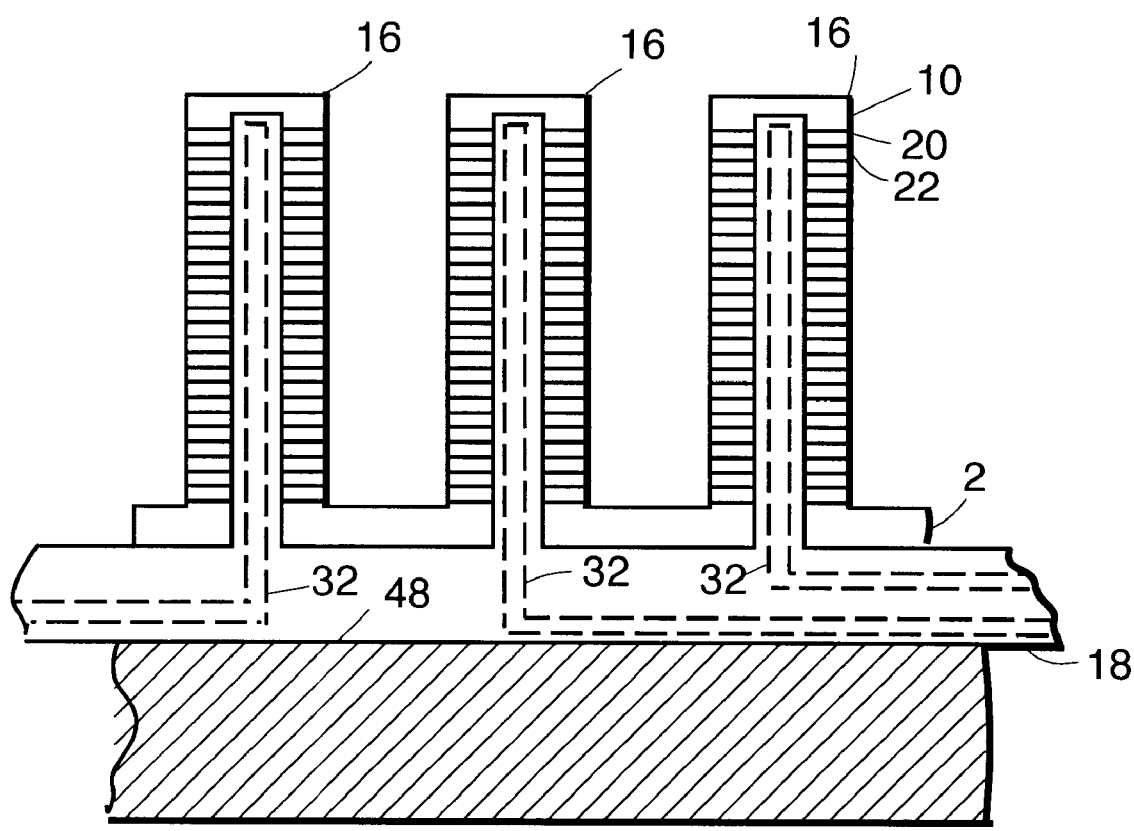
FIG. 3 is at enlarged side elevational view of three actuators showing exible insulator detail.

The side view shown in FIG. 2 shows the actuators attached to their common base and these exposed alternate electrodes. The other side of the same actuator looks the same, but what is exposed are the other set of electrodes. As shown in FIG. 3, each actuator 10,10 has a configuration of multilayers 20 and 22 which are comprised of oppositely charged electrodes which are printed onto stacked layers of piezoelectric ceramic in a vertically interdigitated manner as illustrated. The consecutively ordered layers are oriented such that they are stacked on one another, in an alternating fashion, such that electrodes, of like polarity have an electrode layer of opposite polarity interposed therebetween such that all of the electrodes are in the proper spatial relationship. The internal electrodes are silk screened in a conventional manner onto the piezoelectric ceramic substrate and are aligned with each other using fiducial references.

As best seen in FIG. 3, the silk screened electrode pattern on alternate layers is exposed to one side of each actuator and a conductor wire 32 is run the full length thereof making electrical contact with each associated alternate layer. Each wire conductor 32 is subsequently connected to the actuator drive electronics for electrical actuation purposes. By connecting all of the conductive layers on each side of the actuator together, they can all be energized simultaneously with the same voltage. The result is that each actuator stack is a minimum capacitance, parallel electrical, series mechanical device. The connection shown in FIG. 3 uses a flexible insulator which has conductor runs silk screened on one surface, making contact via conductive epoxy to the vertically exposed, alternate actuator conductors. Each actuator has its own lead so that all of the actuators are capable of being independently actuated. The square cross section of the actuator has an inherent benefit over a circular one in that it is less sensitive during the manufacturing process to dimensional variations in exposing the electrodes. That is, the exposed electrodes are disposed in a "plane" rather than in a "line".

Figure 4:
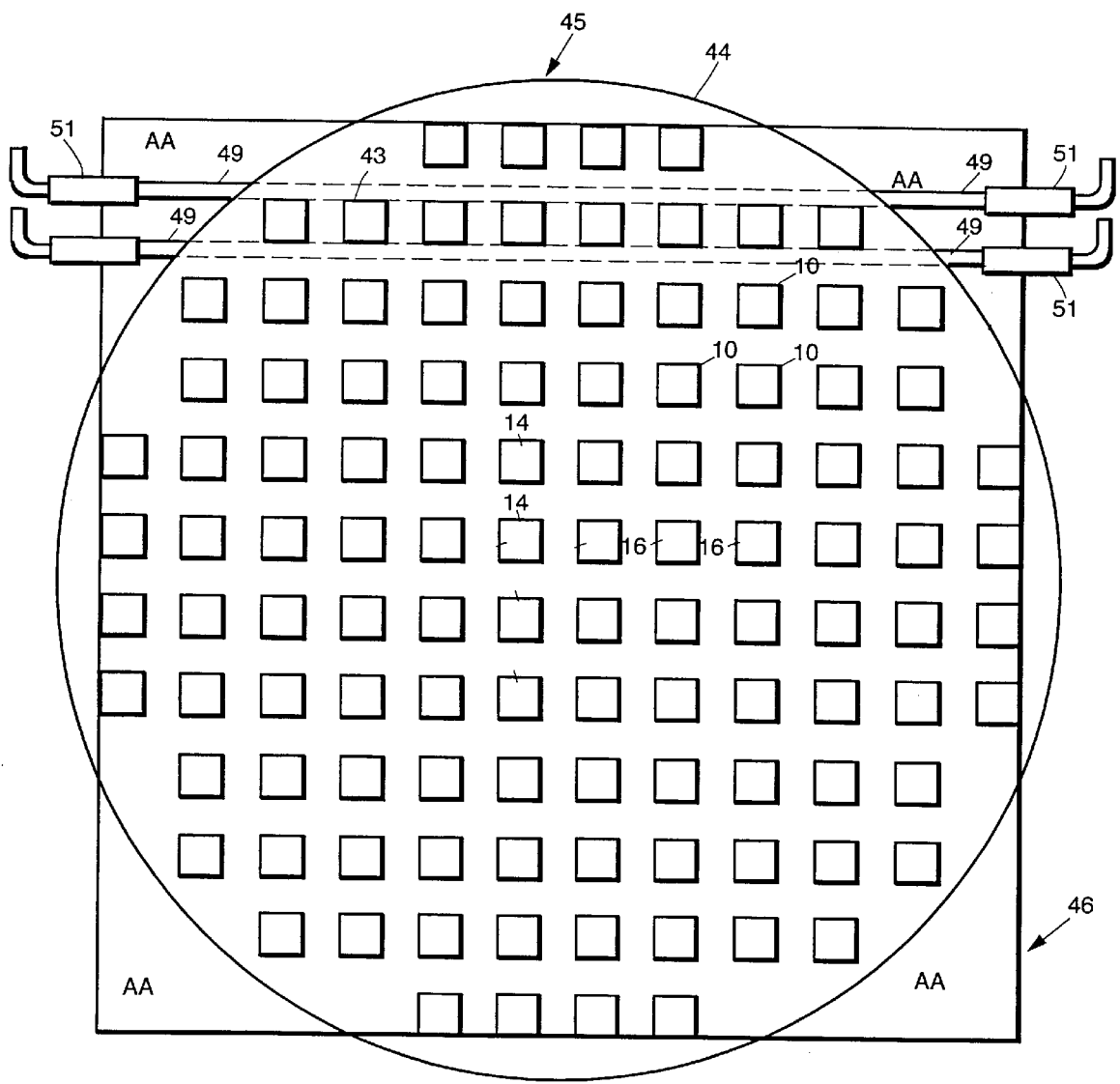
FIG. 4 is a top detailed view of an assembly with a mirror.

FIG. 4 depicts the actuator array block 2 assembled with a deformable mirror or face plate 44 having a reflective surface 43 and an opposite surface 45 attached to a base plate 46. Typically, the array block 2 has a width sufficient to match the diameter of the mirror 44. The base plate 46 has a flat support surface 48 and the array block 2 is bonded to the common base at the surface 48. Both the bottom surface 18 of the actuator array block 2 and top surface 48 of the base are configured flat to ensure proper contact. Likewise, the top surface 16 of each of the actuators 8,8 is made planar to ensure proper mating with the back surface 45 of the face plate 44 of the assembly. As seen in FIG. 2, the tops of all of the actuators are coplanar, and to which the backside 45 of the thin deformable face plate 44 is connected by epoxy.

Each row of actuators 10,10 has a thin flexible conductor with a lead 49,49 tracing from each actuator row and terminating on either end of the row with connectors 51,51. For ease of illustration, only the first two rows of the FIG. 4 have been shown with such lead and tracing connectors. Shown also in FIG. 4 are areas AA where extra or nonfunctional "actuators" otherwise generated as part of the fabrication process have been removed.

In use, the control electronics cause selective ones of the conductors 32 to be energized by a voltage source thereby causing an elongation of the involved actuator(s) 10. Since each actuator 8 is fabricated in a conventional tape cast or water fall multi-layer construction using a piezoelectric material, each actuator in each array layer is changeable in length with voltage such that upon energization of selective one(s) of the actuators 10,10 a local bump or depression is created at the back surface 45 of the mirror 44. Bias voltages of all actuators are sometimes used such that motion of the mirror surface can be in either direction, i.e., plus or minus.

The invention is a unique configuration for a deformable mirror using piezoelectric type actuators made from a single block. The invention thus embodies a monolithic block containing all of the actuators for the deformable mirror, where each actuator has the capability of being actuated individually.

Accordingly, the invention has been described by way of illustration and not limitation.

What is claimed is:

1. An assembly comprising:
   a base;
   a thin optical substrate having a light reflective first surface and an opposite back surface;
   coupling means for controllably movably coupling said back surface of said optical substrate and said base to one another;
   said coupling means including a multilayered medium having a plurality of piezoelectric actuators interspersed in an array therewithin, said array being formed from a single one piece monolithic block containing all of said piezoelectric actuators, and
   wherein each of said plurality of actuators is formed from said one piece block which is cut to create spaces between each actuator which spaces define individual standing ones of said actuators.

2. An assembly as defined in claim 1 further characterized in that said piezoelectric actuators include opposite vertically extending sides defined by a plurality of stacked electrodes which extend to one of said vertically extending sides depending upon the designated polarity thereof.

3. An assembly as defined in claim 2 further characterized in that said assembly includes said plurality of piezoelectric actuators each having a top flat surface which is disposed coplanar with the ends of other piezoelectric actuators.

4. An assembly as defined in claim 3 further characterized in that said plurality of actuators are defined in array and said array being integrally connected by a common base.

5. An assembly as defined in claim 4 further characterized in that said cuts creating spaces between each actuator simultaneously expose the electrodes for making electrical connections thereto.

6. An assembly as defined in claim 5 further characterized in that each actuator has a configuration of multilayers which are comprised of oppositely charged electrodes which are printed onto stacked layers of ceramic in a vertically interdigitated manner.

7. An assembly as defined in claim 4 further characterized in that each actuator has a configuration of multilayers which are comprised of oppositely charged electrodes which are printed onto stacked layers of ceramic in a vertically interdigitated manner.

8. An assembly as defined in claim 7 further characterized in that said electrodes on alternate layers are commonly connected on one of said sides of each actuator and a conductor wire is disposed along said one sides of said actuators and runs the full length thereof making electrical contact with said alternate electrode layers.

9. An assembly as defined in claim 8 further characterized in that each said electrode connection uses a flexible insulator having conductor runs silk screened on one surface, making contact with an associated side of said actuator via a conductive epoxy.

10. An assembly as defined in claim 9 further characterized in that each said electrode is printed partially across the full width of the actuator.

11. An assembly as defined in claim 6 further characterized in that electrical leads are printed onto the sides of each actuator to accomplish the electrical connections to the electrodes.

12. An assembly comprising:

a base;

a thin optical substrate having a light reflective first surface and an opposite back surface;

coupling means for controllably movably coupling said back surface of said optical substrate and said base to one another;

said coupling means including a multilayered medium having a plurality of piezoelectric actuators interspersed in an array therewithin, said array being formed from a single monolithic block containing all of said piezoelectric actuators;

said piezoelectric actuators include opposite vertically extending sides defined by a plurality of stacked electrodes which extend to one of said vertically extending sides depending upon the designated polarity thereof;

said assembly includes said plurality of piezoelectric actuators each having a top flat surface which is disposed coplanar with the ends of other piezoelectric actuators;

said plurality of actuators are defined in array and said array being integrally connected by a common base;

each of said plurality of actuators is formed from said one piece block which is subsequently cut to create spaces between each actuator and simultaneously expose the electrodes for making electrical connections thereto; and each actuator has a configuration of multilayers which are comprised of oppositely charged electrodes which are printed onto stacked layers of ceramic in a vertical interdigitated manner.

* * * * *